(No Model.)
S. M. BEERY.
VALVE.
No. 459,132. Patented Sept. 8, 1891.
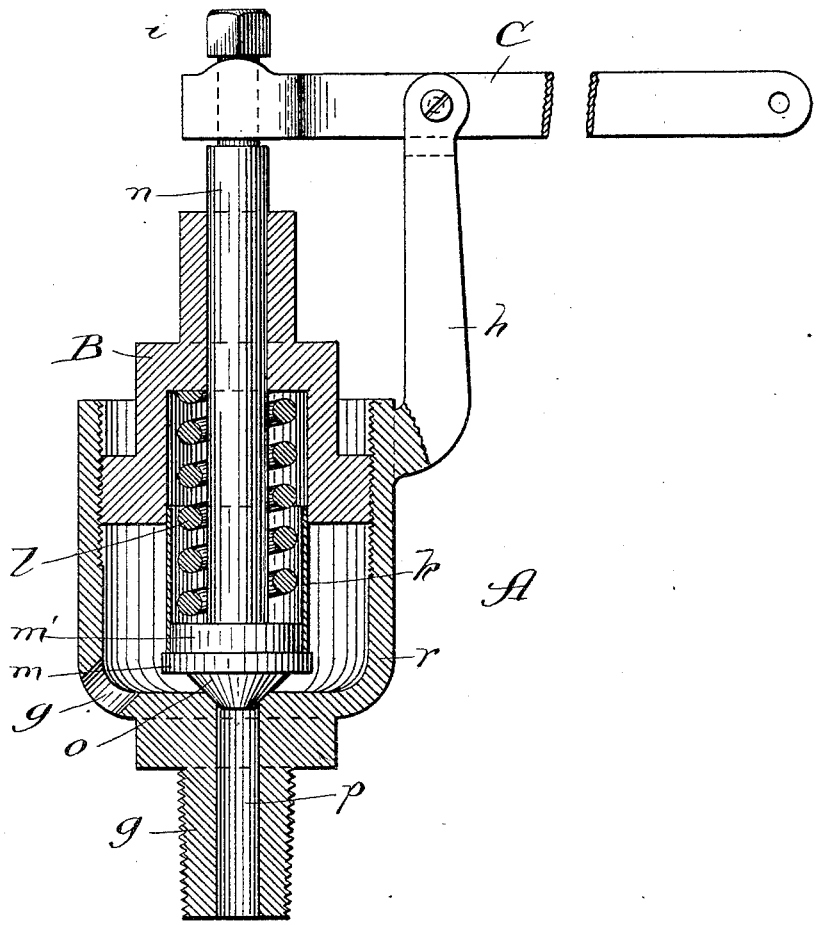
Witnesses
Chas. E. Gaylord,
J. H. Dyrenforth
Inventor
Samuel M. Beery,
By his Attorneys,
Dyrenforth & Dyrenforth

United States Patent Office.

SAMUEL M. BEERY, OF CHICAGO, ILLINOIS, ASSIGNOR OF ONE-HALF TO WILLIAM F. BATES AND HERBERT E. KEELER, OF SAME PLACE.

VALVE.

SPECIFICATION forming part of Letters Patent No. 459,132, dated September 8, 1891.

Application filed March 3, 1891. Serial No. 383,581. (No model.)

*To all whom it may concern:*

Be it known that I, SAMUEL M. BEERY, a citizen of the United States, residing at Chicago, in the county of Cook and State of Illinois, have invented a new and useful Improvement in Valves, of which the following is a specification.

The object of my invention is to provide an improved construction of valve, whereby it shall be adapted to perform the function of a safety-valve and also to be operated by hand for venting purposes.

My improved valve is adapted for use in various connections wherein there is requirement for a safety-valve which may be readily actuated extraneously for venting purposes, and I do not therefore limit my particular construction of valve to any especial connection.

The accompanying drawing shows my improved valve device in sectional elevation.

A is a combined automatic safety and hand-vent valve. I form the same of a shell or chamber $r$, open at one end and terminating at its opposite end in a threaded nipple $g'$, having a passage $p$ extending through it into the chamber, where it terminates in a seat for a valve-head $o$ on a stem $n$, provided at its junction with the head with a circular flange $m$, and beyond the latter with a narrower circular flange $m'$.

B is a thimble adapted to be screwed into the open internally-threaded end of the chamber $r$ and through which the valve-stem passes. The thimble B forms part of a housing for a spring $l$, preferably of the spiral variety illustrated, surrounding the valve-stem and confined between the thimble and flange $m'$, the adjustment of the spring for its regulation being effected by turning the thimble in the proper direction. The remainder of the housing for the spring $l$ is afforded by a tube or sleeve $k$, fastened at one end around the flange $m'$ and extending at its opposite end into the thimble, in which it has adequate reciprocating play. At the outer end of the stem $n$ is a squared head $i$ for adapting the valve-head to be readily turned to loosen it in its seat if it should ever adhere thereto, as by corrosion or by lime accumulation from the water entering the valve. Near the head $i$ the stem is reduced to be embraced by one end of a lever C, fulcrumed upon an arm $h$, extending from the valve-shell and adapted to have connected with its free end a chain to lead into accessible position for manipulating through it the lever. In the base of the chamber $r$ is an outlet or vent opening $g$. It will be noticed that by the peculiar construction involving the provision of the seating-flanges $m$ and $m'$ for the tube $k$, whereby a very tight joint is afforded, the spring $l$ and the valve-stem are effectually shielded against access to either of the fluids (steam or water) which enters the chamber. This protects the parts against corrosion or the accumulation upon them of salt from brine when the latter is the liquid for the control of which the valve is employed, as in the case of hot-water circulation for heating purposes, in which connection it is common for the safety-valve to become so obstructed against action by corrosion, and frequently by the accumulation upon the regulating-spring of salt, as to endanger the system, the latter cause having, in my own experience, entailed bursting of the expansion-drum. Where in a system of hot-water circulation the expansion-drum is provided with a mere safety-valve, it is difficult and requires considerable time to induce circulation of the liquid. This is due to the rise of the water as it becomes initially heated into the expansion-drum, wherein it compresses the air and the gases generated from the water, thus forming a cushion which obstructs the circulation till the water becomes sufficiently heated to generate sufficient pressure to overcome the obstruction. Obviously this not only retards starting the circulation, but it necessitates the consumption of considerable fuel in overcoming the cushion obstruction, which entails material waste.

My improved valve applied to the expansion-drum of the circulating system overcomes this difficulty, since when the cushioning obstruction referred to occurs the lever C may be manipulated to raise the valve from its seat and thus permit the accumulated gases to escape.

My particular construction of valve A is especially effective for the purpose stated. In my own experience I have succeeded in producing the circulation in cars having hot-water heating systems provided on the expansion-drums with automatic safety and hand-vent valves in forty-five minutes with great saving of coal over the operation where no such valve is provided (and without which it requires from one hour to an hour and a half to start the circulation) by being enabled to relieve the cushion obstruction in the expansion-chamber by simply operating the lever.

The single vent-opening $g$ of my improved construction affords the advantage of preventing the air-currents from spattering over the car the liquid which enters the valve-chamber $r$ and enables such liquid to flow readily into the usual drip-pan, whereas the numerous perforations in the shells of other safety-valves known to me, by permitting the air-currents to circulate through the shells, permit such spattering.

What I claim as new, and desire to secure by Letters Patent, is—

1. A valve device comprising, in combination, the shell $r$, open at its upper end and having in its base the inlet-passage $p$ and vent-opening $g$, a valve-head $o$, seated over the inlet on a stem $n$, provided at its junction with the head with a circular flange $m$ and beyond the latter with a narrower circular flange $n'$, a thimble B, screwed into the upper end of the shell and through which the valve-stem passes, a regulating-spring $l$, extending into and confined and partly housed in the thimble, and a sleeve $k$, fastened at one end around the flange $m'$ and extending at its opposite end into and telescoping with the thimble and completing therewith an extensible and contractible housing for the spring, substantially as described.

2. A combined automatic safety and hand-vent valve A, comprising, in combination, a shell $r$, terminating at one end in a threaded nipple $q$, containing the inlet-passage, a vent-opening $g$ in the base of the shell, a threaded thimble B, screwed into the open end of the shell and forming the stationary part of a spring-housing, a stem $n$, having a valve-head $o$ seated over the inlet $q$ and flanges $m$ and $m'$, a regulating-spring $l$, surrounding the stem and confined between the flange $m'$ and thimble, a sleeve $k$, surrounding the stem and spring and extending from the flange $m$ into and telescoping with the thimble to form the remainder of the spring-housing, a head $i$ on the stem, and a lever C, fulcrumed on the shell and engaging the valve-stem, substantially as described.

SAMUEL M. BEERY.

In presence of—
J. W. DYRENFORTH,
M. J. FROST.